Nov. 24, 1964    J. J. M. PRAGNELL    3,158,399
SAFETY HARNESS

Original Filed March 27, 1962    2 Sheets-Sheet 1

INVENTOR
JOHN JAMES M. PRAGNELL

BY
ATTORNEY

Nov. 24, 1964   J. J. M. PRAGNELL   3,158,399
SAFETY HARNESS
Original Filed March 27, 1962   2 Sheets-Sheet 2
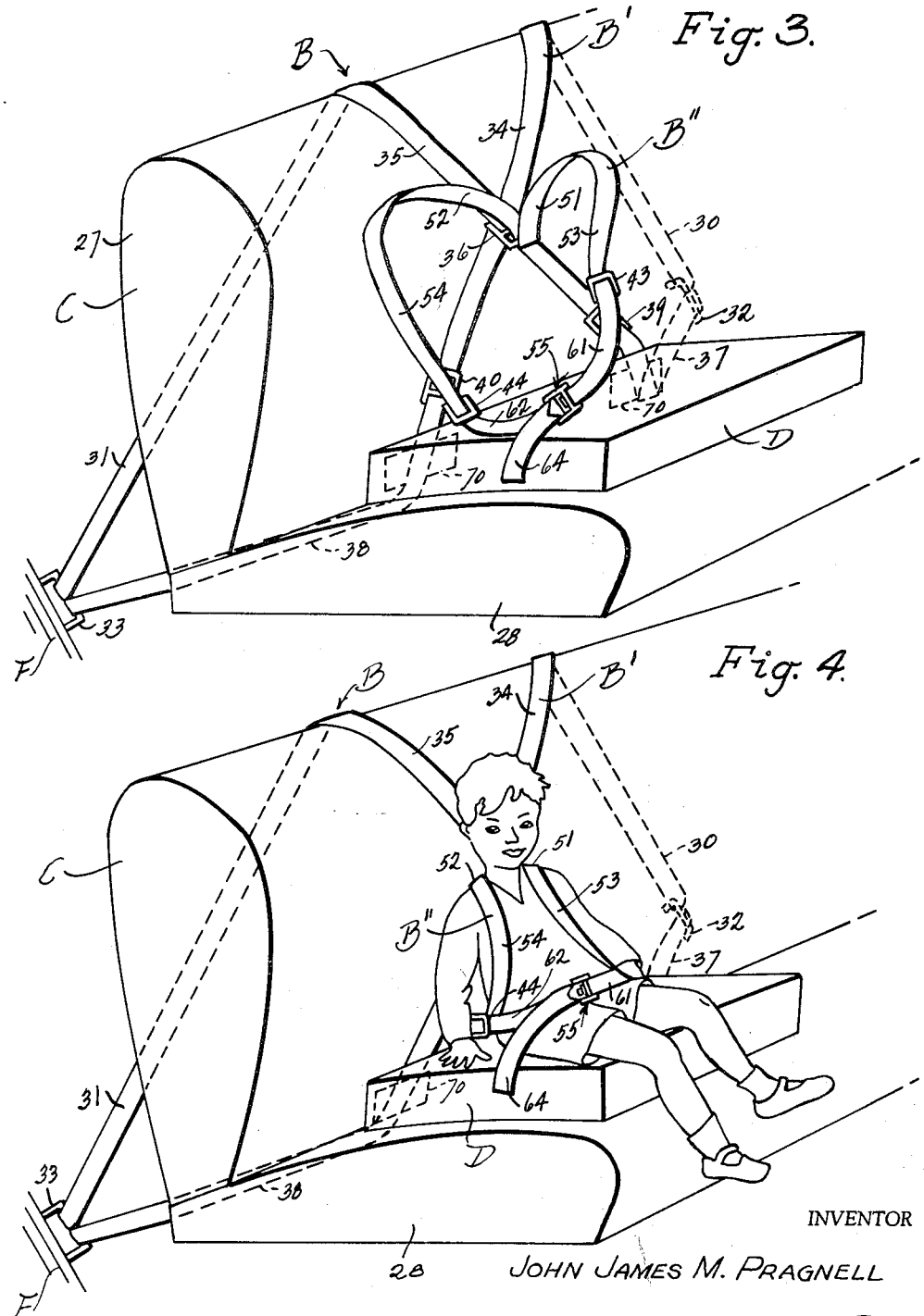
INVENTOR
JOHN JAMES M. PRAGNELL
BY Rommel, Allwine & Rommel
ATTORNEY 3,158,399
SAFETY HARNESS
John J. M. Pragnell, Tilford, near Farnham, Surrey, England, assignor to Irving Air Chute Co., Inc., Lexington, Ky., a corporation of New York
Original application Mar. 27, 1962, Ser. No. 182,784. Divided and this application Feb. 20, 1963, Ser. No. 259,954
4 Claims. (Cl. 297—389)

This is a division of application Serial No. 182,784, filed March 27, 1962.

This invention relates to improvements in safety harnesses adaptable for wear by aviators and motorists.

The primary object of this invention is the provision of vehicle safety harness adaptable for wear by individuals riding in motor vehicles having both lap and shoulder strap means to secure the individual in a safe yet comfortable position in the vehicle.

A further object of this invention is the provision of a vehicle safety harness which is relatively simple and durable and while insuring a maximum of protection to the wearer, affords freedom of movement for desirable or necessary movements of the wearer. The harness structure affords forward restraint in the region of the lap of the user and the region of the shoulders but permits the wearer to twist the upper part of the body in both directions, such as is desirable for comfort, or in the case of the driver of the vehicle, necessary for instrument control while at the same time firmly restrain the body against forward movement such as may occur due to sudden stoppage.

A further object of this invention is the provision of a harness particularly adapted for use by children, comprising a seat attachable portion and a harness with parts to attach to a child and to the seat attachable portion.

Other objects and advantages of this invention will be apparent during the course of the following detailed description.

In the accompanying drawings, forming a part of this specification, and wherein similar reference characters designate corresponding parts throughout the several views:

FIGURE 3 is a perspective view of the complete harness adapted for child's use including the seat attachable portion of the harness as shown in FIGURE 1 and a child's lap and shoulder strap structure of the body encasing harness.

FIGURE 4 is a perspective view showing the complete harness of FIGURES 1 and 2 fitted upon a child and to the vehicle seat.

Figure 1:
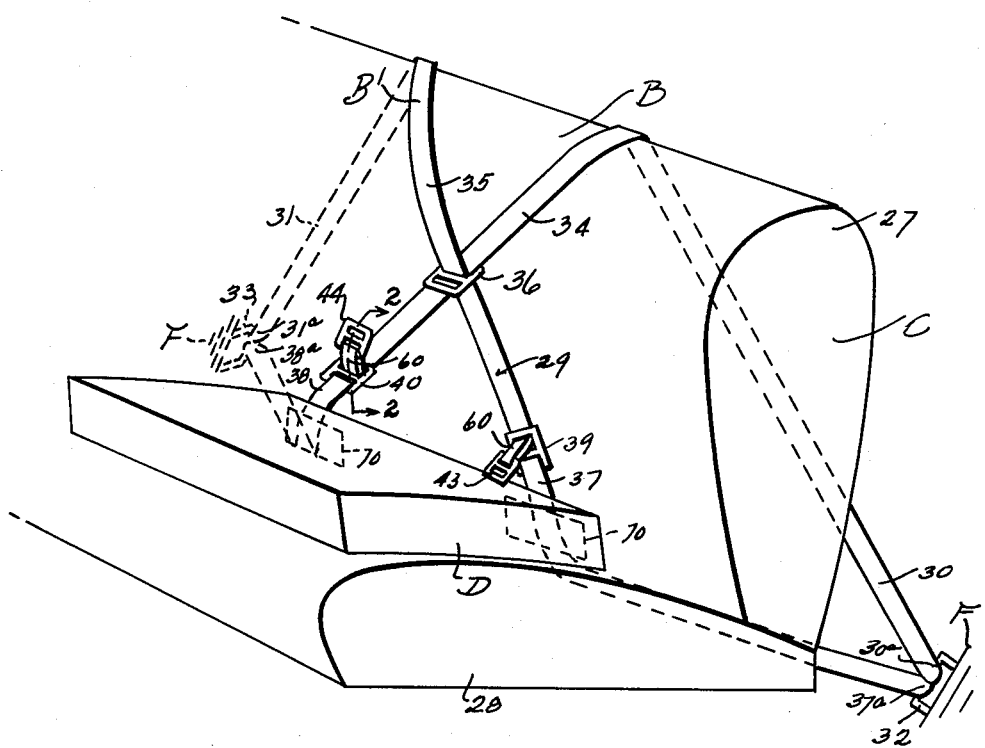
FIGURE 1 is a perspective view of the improved harness particularly adapted for children showing only a seat attachable portion of such harness.
Figure 2:
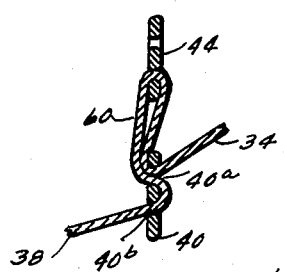
FIGURE 2 is a cross sectional view taken through certain connections or fittings of the harness of FIGURE 1 substantially on the line 2—2 of FIGURE 1.

Referring to the form of safety strap structure B as shown in FIGURES 1, 2, 3 and 4, the same includes a harness B', shown in FIGURE 1 adapted to be attached to the vehicle and its seat structure C. The latter may include a back 27 and a seat proper 28. Mainly the harness portion B' is secured to the back 27 of the seat structure and to the vehicle and furnishes anchoring points for the individual harness portion B" adapted to encase a wearer.

The seat attaching harness portion B' comprises rear straps 30 and 31 which are secured at 30ª and 31ª at their lower ends to U-bolts 32 and 33; the latter being detachably connected to the chassis or frame F' of the vehicle. From the anchor bolts 32 and 33 the straps 30 and 31 tautly extend upwardly in convergent relation rearwardly of the back 27 of the seat C and thence tightly over the top of the seat and thence downwardly to provide front seat straps 34 and 35 which cross each other at a location where a ring fitting 36 is positioned. The fitting 36 is provided with two slots, one of which slidably receives the straps 34 and 35 therethrough and the other slot of which is adapted to slidably receive a portion of the body encasing strap assemblage B".

The assemblage B' furthermore includes side straps 37 and 38 which are continuations of straps 35 and 34 respectively and which are respectively secured at 37ª and 38ª to chassis attached bolts 32 and 33, as shown in FIGURE 1. The straps 37 and 38 converge forwardly and upwardly from bolts 32 and 33 and are slipped between the back and seat of the seat structure C. Friction fittings 39 and 40 are provided upon the straps 37 and 38, above seat 28, each of which has a lower slot 40ᵇ through which the straps 37 or 38 are respectively extended. The straps 37 and 38 are then doubled at 60 and extended through the other slot 40ª of the fitting 39 or 40 as the case may be. The strap portions 31, 35 and 37 consist of a single continuous length and the straps 30, 34 and 38 consist of a single continuous length. The bight of each doubled portion 60, best shown in FIGURE 2 of the drawing, extends through a slot of fitting 43 or 44, which also has a second slot therein adapted to slidably receive a portion of the wearer encasing harness B" as will be subsequently described.

The overlapped harness portions extended through the slot 40ª have a snug-sliding fit therein so the loop 60 may be adjusted to a desired length, suitable to the stature of the child.

Referring to the body encasing webbing or harness portion B" the same includes continuous shoulder straps 51 and 52 (see FIG. 3) which are adjustably threaded through the free slot of the fitting 36. Straps 51 and 52 extend downwardly to provide front side breast straps 53 and 54 which respectively at the lower ends thereof are adjustably threaded through the free slots of the fittings 43 and 44, the side straps 53 and 54 then being extended to provide lap strap portions 61 and 62 which are detachably held together by means of the quick release and take up buckle 55.

The positioning of the encasing harness B" upon the individual will be apparent from the foregoing. The fittings 39 and 40 may be adjusted upon the seat back attaching straps 37 and 38 to the height desired, and the body webbing B" adjusted through the rings or fittings 36, 43 and 44. With the complementary sections of the release buckle 55 separated a child can easily adjust the webbing B" upon his body and the buckle portions of the quick release buckle connected with the pull end 64 in position to tension the lap strap and shoulder straps upon his body.

For a small child a cushion D may be used, having loops 70 thereon through which the straps 37 and 38 may be threaded. This will hold the raising cushion D rearwardly in place upon the seat 28.

The child will be free to move for limited twisting movement as with the harness A, and the arrangement B holds the child so that he can lean slightly forward and slide the hips forwardly to a small extent while the shoulders will be securely held against too far forward movement.

If found desirable, a piece of webbing may be attached to the cushion D and to the lap strap, passing between the child's legs, thus providing a crotch strap.

Various changes in the size, shape and arrangement of parts may be made to the form of invention herein shown and described without departing from the spirit of the invention or scope of the claims.

I claim:
1. In a vehicle safety harness construction, the combination of a vehicle supporting frame including a seat and a seat back, connectors secured to said frame at each side of the seat, webbing connected to said connectors and extending upwardly and over the rear of the seat back to the front thereof, front webbing portions connected to the upper ends of the webbing at the top of the seat back and extending downwardly in crossed relation and therefrom extending to and connectable at the sides of the seat portion to said connectors, a fitting adjustably mounted at the point of crossing of the front webbing portions, adjustable fittings on the lower ends of said front webbing portions at a locus below the first mentioned fitting, and body encasing harness including portions adjustable extending through said fittings for holding the shoulders of a wearer in position against the back and the lower portion of the body against the lower portion of said back.

2. A safety harness as described in claim 1 in which the body encasing harness comprises webbing slidably extended through the first mentioned fitting and includes shoulder straps extended downwardly to provide side straps which are adjustably threaded through the lowermost fittings, said side straps below said lowermost fittings being divided into lap straps, and an adjustment buckle connecting the meeting ends of said lap straps.

3. In a safety strap structure for vehicles, the combination of a vehicle frame including a seat with a seat back, side connectors rigidly attached to said frame, back straps connected to said connectors extending upwardly in convergent relation at the rear of the seat back and extended over the top of the seat and thence downwardly over the front of the seat in crossing relation and at their lower ends being extended laterally in divergent relation and attached to said connectors, said straps at the point of crossing at the front of the seat back having a ring fitting and below said ring fitting being doubled upon themselves to provide looped portions in spaced relation, friction fittings holding said loop portions in looped relation, and webbing attaching fittings mounted upon the bights of said loops.

4. A safety harness as described in claim 3 in which a body encasing harness is provided including shoulder straps connected together and slidably extended through the first mentioned fitting, said shoulder straps having continuous side straps the lower ends of which are adjustably threaded through the bight fittings attached to said loops and the ends of said side straps being extended together to provide a lap strap, and an adjustment buckle means connecting the meeting ends of said lap strap.

References Cited by the Examiner
UNITED STATES PATENTS

| | | | |
|---|---|---|---|
| 2,365,626 | 12/44 | Carlisle | 280—150 |
| 2,576,867 | 11/51 | Wilson | 297—389 |
| 2,655,329 | 10/53 | Martin | 244—122 |
| 2,710,649 | 6/55 | Griswold, et al. | 244—122 |
| 2,823,046 | 2/58 | Banta | 297—389 |
| 2,898,976 | 8/59 | Barecki | 297—386 |
| 3,028,200 | 4/62 | Dye | 297—389 |
| 3,043,625 | 7/62 | Bohlin | 297—389 |

FRANK B. SHERRY, *Primary Examiner.*